United States Patent
Fukuda et al.

(10) Patent No.: US 11,521,021 B2
(45) Date of Patent: Dec. 6, 2022

(54) OBJECT RECOGNITION SYSTEM AND OBJECT RECOGNITION METHOD

(71) Applicant: HITACHI, LTD., Tokyo (JP)

(72) Inventors: Shun Fukuda, Tokyo (JP); Martin Klinkigt, Tokyo (JP); Atsushi Hiroike, Tokyo (JP); Toshiaki Tarui, Tokyo (JP)

(73) Assignee: HITACHI, LTD., Tokyo (JP)

( * ) Notice: Subject to any disclaimer, the term of this patent is extended or adjusted under 35 U.S.C. 154(b) by 140 days.

(21) Appl. No.: 16/838,256

(22) Filed: Apr. 2, 2020

(65) Prior Publication Data

US 2020/0327380 A1 Oct. 15, 2020

(30) Foreign Application Priority Data

Apr. 9, 2019 (JP) .............................. JP2019-074330

(51) Int. Cl.
*G06K 9/62* (2022.01)
*G06N 3/08* (2006.01)

(52) U.S. Cl.
CPC ......... *G06K 9/6263* (2013.01); *G06K 9/6257* (2013.01); *G06N 3/08* (2013.01)

(58) Field of Classification Search
CPC ............... G06K 9/6263; G06K 9/6257; G06K 2009/00328; G06K 2209/27; G06K 9/6227; G06K 9/00362; G06K 9/00771; G06K 9/4604; G06K 9/4652; G06K 2209/23; G06N 3/08; G06N 3/0454
See application file for complete search history.

(56) References Cited

U.S. PATENT DOCUMENTS

| | | | |
|---|---|---|---|
| 6,496,815 B1 | 12/2002 | Kawashima | |
| 10,776,626 B1* | 9/2020 | Lin | G06V 10/82 |
| 2005/0129306 A1* | 6/2005 | Wang | G06T 5/002 |
| | | | 348/E5.064 |
| 2018/0157972 A1* | 6/2018 | Hu | G06N 3/08 |
| 2018/0330183 A1* | 11/2018 | Tsunoda | G06K 9/6262 |
| 2019/0102631 A1* | 4/2019 | Li | G06V 10/764 |

FOREIGN PATENT DOCUMENTS

| | | |
|---|---|---|
| CN | 105891215 A | 8/2016 |
| CN | 106529402 A | 3/2017 |
| CN | 106934392 A | 7/2017 |
| JP | 6392478 B1 | 8/2018 |

OTHER PUBLICATIONS

Singapore Written Opinion dated May 21, 2021 for Singapore Patent Application No. 10202003089V.
Singapore Search Report dated May 21, 2021 for Singapore Patent Application No. 10202003089V.

* cited by examiner

*Primary Examiner* — John W Lee
(74) *Attorney, Agent, or Firm* — Volpe Koenig

(57) ABSTRACT

In a data driven object recognition system and object recognition method, a connection relationship between an object feature extraction unit and a plurality of task-specific identification units is stored in a connection switch according to a type of task. The connection relationship is changed based on the connection information to suppress the amount of labeling in constructing a learning data set.

7 Claims, 7 Drawing Sheets

FIG. 2

| TASK COMBINATION ID | IMAGE NAME | TASK (AGE) LABEL | TASK (HAIR COLOR) LABEL | TASK (GENDER) LABEL |
|---|---|---|---|---|
| 1 | IMAGE 1-1 | 53 YEARS OLD | × | MALE |
| ... | ... | ... | ... | ... |
| 1 | IMAGE 1-10 | 37 YEARS OLD | × | FEMALE |
| 2 | IMAGE 2-1 | × | WHITE | MALE |
| ... | ... | ... | ... | ... |
| 2 | IMAGE 2-20 | × | BROWN | FEMALE |
| 3 | IMAGE 2-10 | × | (DATA CORRUPTION) | FEMALE |

|  | TASK COMBINATION ID | TASK LOSS (AGE) | TASK LOSS (HAIR COLOR) | TASK LOSS (GENDER) |
|---|---|---|---|---|
| FIRST TIME | 1 | 0.4 | × | 0.8 |
| SECOND TIME | 2 | × | 0.7 | 0.5 |
| THIRD TIME | 1 | 0.9 | × | 0.1 |
| ... | ... | ... | ... | ... |

| TASK ID | 1 (AGE) | 2 (HAIR COLOR) | 3 (GENDER) |
|---|---|---|---|
| CONNECTION | 1 | O | 1 |

| TARGET TASK | TASK-SPECIFIC IDENTIFICATION UNIT (AGE) | TASK-SPECIFIC IDENTIFICATION UNIT (HAIR COLOR) | TASK-SPECIFIC IDENTIFICATION UNIT (GENDER) |
|---|---|---|---|
| DEGREE | 0.5 | 0 | 0.3 |

FIG. 9

| IMAGE NAME | IMAGE DATA |
|---|---|
| IMAGE 1-1 | DATA OF IMAGE 1-1 |
| ... | ... |
| IMAGE 1-10 | DATA OF IMAGE 1-10 |
| IMAGE 2-1 | DATA OF IMAGE 2-1 |
| ... | ... |
| IMAGE 2-20 | DATA OF IMAGE 2-20 |
| ... | ... |

OBJECT RECOGNITION SYSTEM AND OBJECT RECOGNITION METHOD

BACKGROUND OF THE INVENTION

1. Field of the Invention

The present invention relates to an object recognition system and an object recognition method.

2. Description of the Related Art

In recent years, as globalization has progressed, people from various countries have come and gone. However, there is an increasing demand for security due to concerns of diminished security. However, in some countries including Japan, since the working population has been decreased, there is a need for mechanical solutions using computers.

One of these technologies is a video analysis technology using a neural network. The neural network is a data-driven method for learning an effective feature extraction method from a given learning data set. As the learning data set has more data of an evaluation environment, recognition accuracy of the neural network becomes higher. When the learning data set is large and is diverse, the recognition accuracy is increased in a general-purpose environment.

The learning data set includes an image and a label of a target task to be solved. The image can be mechanically collected by capturing with a camera. However, since most of the creation of the label needs to be manually performed, there is a problem that high human costs are required in creating the learning data set.

Since a multi-task neural network that performs a plurality of estimations outputs estimation results in consideration of the relevance thereof, higher accuracy can be realized than that in a single-task neural network.

In order to realize the higher accuracy, it is necessary to give labels to multiple tasks. As the number of tasks becomes larger, the amount of work is larger than that of the single task. A data loss occurs due to a human error or an influence of a data storage and a communication environment, and thus, a part of the label may be lost.

JP 6392478 B proposes a method of generating a training label indicating a degree of association in order to prevent the data loss.

SUMMARY OF THE INVENTION

However, in JP 6392478 B, since a construction work of a prerequisite data set has a large amount of labeling, there is a practical problem.

An object of the present invention is to suppress the amount of labeling in a construction work of a prerequisite data set in an object recognition system.

An object recognition system according to an aspect of the present invention is an object recognition system that includes a storage unit and a learning control unit. The storage unit includes an image unit that stores an image of an object, a label unit that stores a label which is information related on a task which is an attribute of the object, and an estimator that estimates the task of the object, and outputs an estimation result. The estimator includes an object feature extraction unit that extracts an object feature value from the image, a plurality of task-specific identification units that identifies the information of the task, and a connection switch that stores connection information between the object feature extraction unit and the plurality of task-specific identification units. The learning control unit changes a connection relationship between the object feature extraction unit and the plurality of task-specific identification units based on the connection information stored in the connection switch according to a type of the task.

An object recognition method according to another aspect of the present invention is an object recognition method using an object recognition system that includes a storage unit and a learning control unit. The method includes storing, by the storage unit, an image of an object and a label which is information related to a task which is an attribute of the object, extracting, by an object feature extraction unit, an object feature value from the image of the object, identifying, by a plurality of task-specific identification units, the information of the task, and changing, by the learning control unit, a connection relationship between the object feature extraction unit and the plurality of task-specific identification units according to a type of the task, estimating the task of the object, and outputting an estimation result.

According to one aspect of the present invention, it is possible to suppress the amount of labeling in a construction work of a prerequisite data set in the object recognition system.

BRIEF DESCRIPTION OF THE DRAWINGS

FIG. 2 is a diagram illustrating an example of a label unit;

FIG. 9 is a diagram illustrating an example of an image unit.

DESCRIPTION OF THE PREFERRED EMBODIMENTS

Hereinafter, an embodiment will be described with reference to the drawings.

Embodiment

Figure 1:
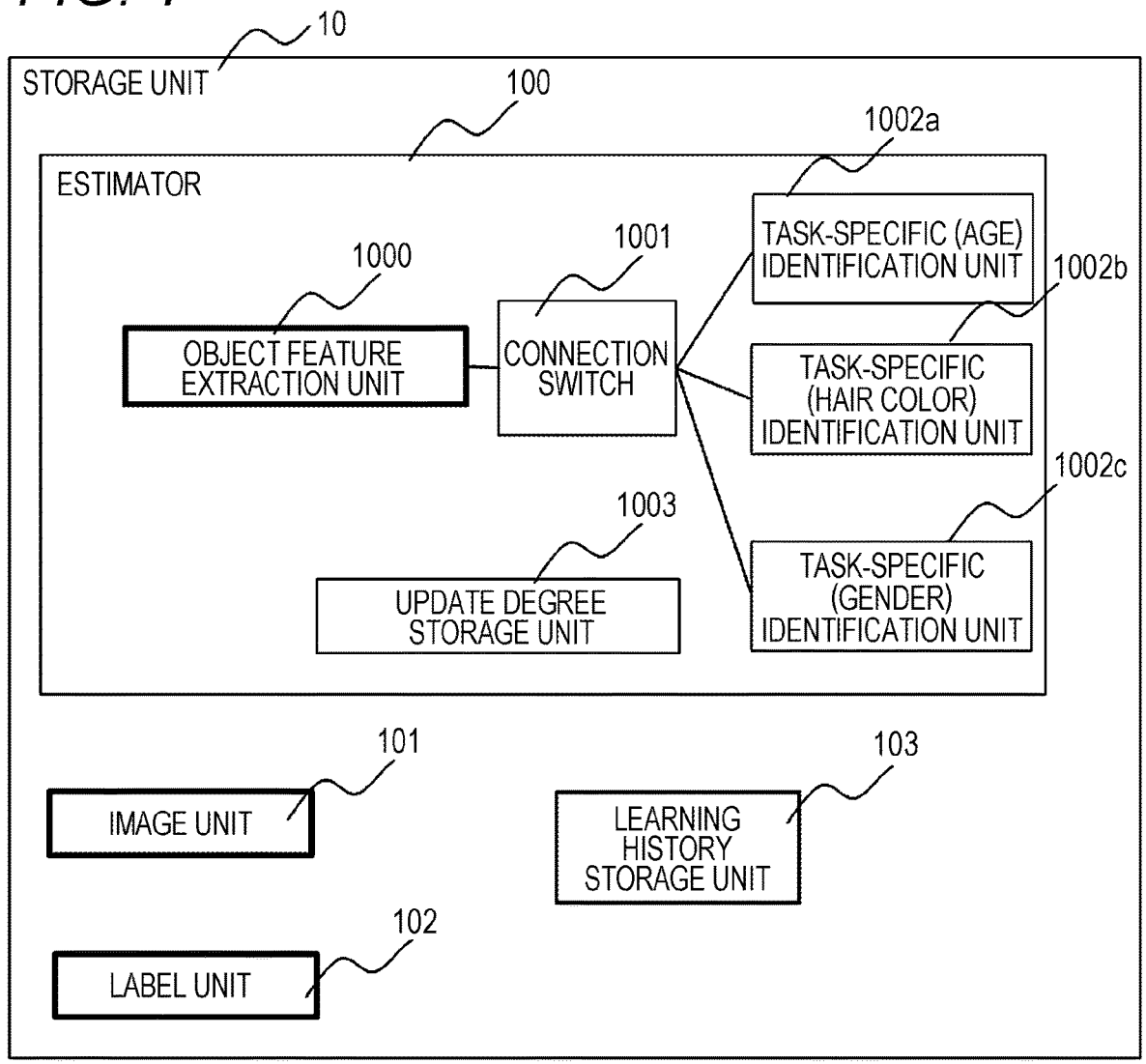
FIG. 1 is a block diagram illustrating a system configuration according to an embodiment.
Figure 1:
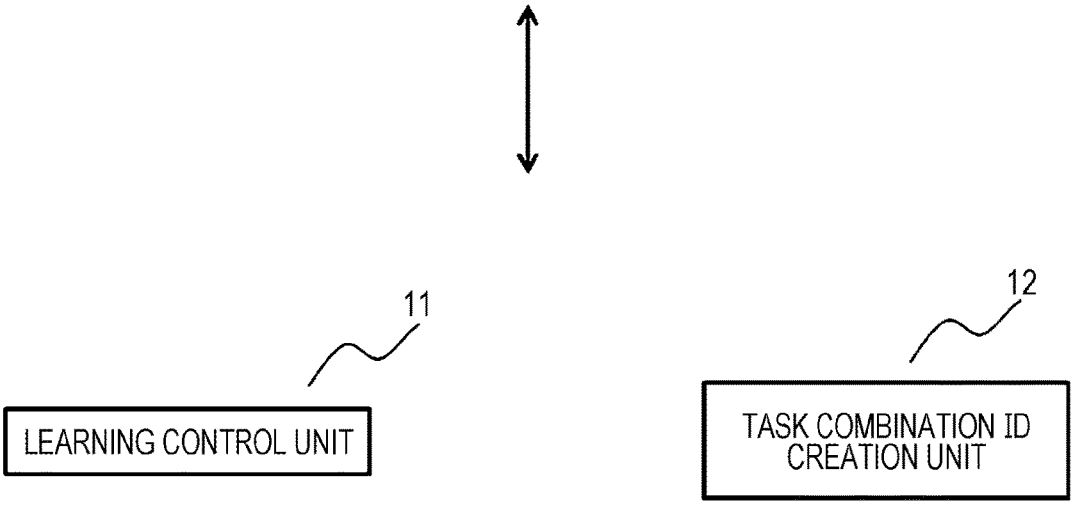

A configuration of an object recognition system according to the embodiment will be described with reference to FIG. 1.

The object recognition system includes a storage unit 10, a learning control unit 11, and a task combination ID creation unit 12. The storage unit 10 includes an estimator 100, an image unit 101, a label unit 102, and a learning history storage unit 103.

The estimator 100 includes an object feature extraction unit 1000, a connection switch 1001, and a task-specific identification unit 1002. Here, the task-specific identification unit 1002 includes a plurality of task-specific identification units 1002a to 1002c. The estimator 100 receives a person image as an input, and outputs an estimation result of a person for each task. Data of the estimator 100 is present within, for example, a video memory.

The object feature extraction unit 1000 is constituted by a neural network. This neural network has parameters updatable through learning. A function of the object feature extraction unit 1000 converts the person image received as the input into a third-order tensor called a feature value. For the image of the same person, the object feature extraction unit 1000 is parameter-tuned such that tensors are close to each other, and the feature value is the third-order tensor from the person image so as to distinguish between persons.

The connection switch 1001 stores a connection symbol or a disconnection symbol indicating connection information between the object feature extraction unit 1000 and the task-specific identification units 1002a to 1002c according to a label attached to the input image.

The task-specific identification unit 1002 is constituted by a neural network. This neural network has parameters updatable through learning. A function of the task-specific identification unit 1002 is to decode information on each task for an object feature value. A format of the decoded output result is expressed by a decimal vector.

In the present embodiment, an age, a hair color, and a gender are set as tasks, for example. The task of the task-specific (age) identification section 1002a is the age, the task of the task-specific (hair color) identification section 1002b has the hair color, and the task of the task-specific (gender) identification section 1002c is the gender.

An update degree storage unit 1003 stores a degree of update of the parameter during learning for the object feature extraction unit 1000 and the task-specific identification unit 1002.

The image unit 101 retains images collected from data sets for various tasks. As illustrated in FIG. 9, the image unit includes an image name 9a and image data 9b. For example, the image unit 101 is present as a database within a storage (SSD or HDD).

The label unit 102 retains an image name of an image retained by the image unit 101 and a label of each task. The label of each task is a label value when the image corresponds to the task, and is a missing value when the image does not correspond to the task. For example, the label unit 102 is present as a database within a storage (SSD or HDD).

The learning control unit 11 performs processing such as transfer of data and calculation of learning. For example, the learning control unit 11 transmits the image and the label received from the image unit 101 and the label unit 102 to the object feature extraction unit 1000. The label is converted into a one-hot expression vector. The learning control unit adjusts the connection switch 1001. The learning control unit changes the update degree storage unit 1003. The learning control unit updates the parameters of the estimator 100. The learning control unit 11 includes, for example, a CPU and a GPU.

The learning history storage unit 103 retains learning conditions and results up to the latest point of time. The learning history storage unit 103 is present within, for example, a memory.

The update degree storage unit 1003 stores a variable for controlling the intensity of the amount of update of parameters of the object feature extraction unit 1000 or the task-specific identification unit 1002 according to a learning situation up to immediately before. The update degree storage unit 1003 is present within, for example, a memory.

A data structure of the label unit 102 will be described with reference to FIG. 2.

The label unit 102 is a correct answer value of each task attached to each image. As illustrated in FIG. 2, the label unit includes a task combination ID 2a, each image name 2b, and a correct answer value 2c of each task including three tasks.

The task combination ID 2a is an ID of each combination assigned to combinations having the same label. The task combination ID is a blank field before learning. The task combination ID is created in the beginning of learning, and is used during learning.

The image name 2b stores an address of the image unit 101 of the image to which each record corresponds. A correct answer label for a corresponding task and a missing value for a non-corresponding task are stored in the correct answer value 2c. The missing value is expressed as x in FIG. 2, but may be expressed as another symbol.

A data structure of the learning history storage unit 103 will be described with reference to FIG. 3.

The learning history storage unit 103 is a storage unit that records connection conditions and task loss of the tasks up to the latest point of time (the definition of the task loss will be described below).

Figure 3:
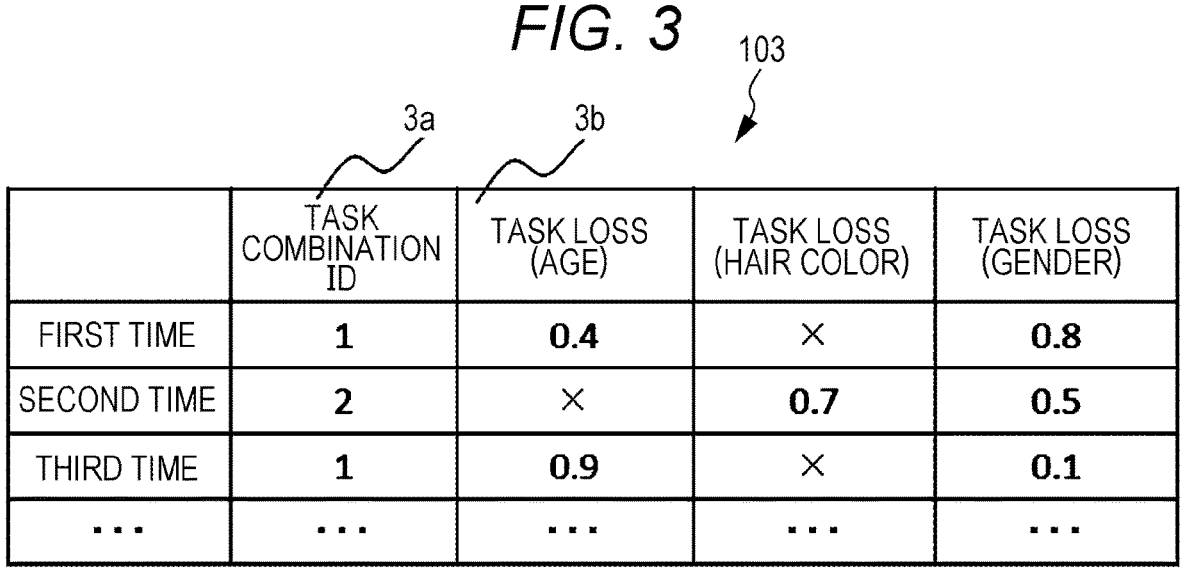
FIG. 3 is a diagram illustrating an example of a learning history storage unit.

As illustrated in FIG. 3, the learning history storage unit includes a task combination ID 3a and a task loss 3b in each learning step. The task combination ID of each learning step is stored in the task combination 3a. An error between an output value and the correct answer value of the task-specific identification unit 1002 of the corresponding task is input, and the missing value is input for the non-corresponding task. In FIG. 3, the missing value is expressed as x, but may be expressed as another symbol.

Figure 4:
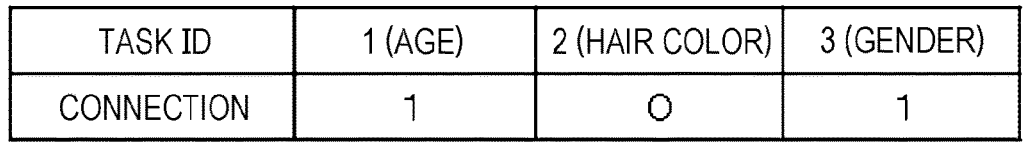
FIG. 4 is a diagram illustrating an example of a connection switch.

A data structure of the connection switch 1001 will be described with reference to FIG. 4.

The connection switch 1001 stores connection information between the object feature extraction unit 1000 and the task-specific identification units 1002a to 1002c. The connection switch includes fields corresponding to the number of tasks, and stores a connection symbol or a disconnection symbol. FIG. 4 is an example in which the connection symbol is expressed as 1 and the disconnection symbol is expressed as 0.

A data structure of the update degree storage unit 1003 will be described with reference to FIG. 5.

The update degree storage unit 1003 stores a value for adjusting the degree of update of the parameter in order to learn the plurality of task-specific identification units 1002a to 1002c in a well-balanced manner.

Figure 5:
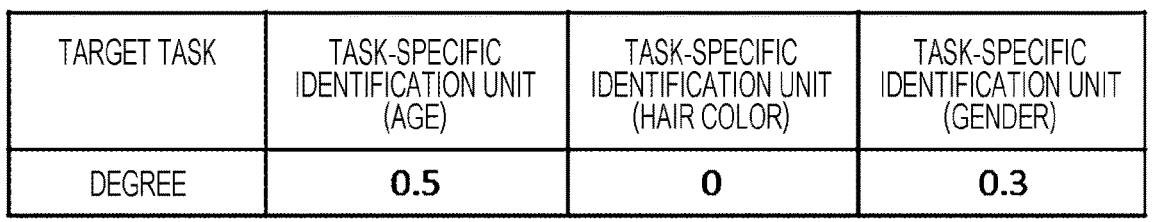
FIG. 5 is a diagram illustrating an example of an update degree storage unit.

As illustrated in FIG. 5, decimal values indicating intensity are stored in the task-specific identification units 1002a to 1002c. The missing value is stored in the disconnected task-specific identification unit 1002b. The missing value is expressed as 0 in FIG. 5, but may be expressed as another symbol.

Next, an equation calculation of the object feature extraction unit 1000 will be described.

When the parameter of the neural network of the object feature extraction unit 1002 is θ and the calculation is f, in a case where an image x is input, a feature value z is output by the following (Equation 1).

[Expression 1]

$$z = f(x; \theta) \qquad \text{(Equation 1)}$$

Here, θ indicates a parameter of the neural network of the object feature extraction unit 1002.

When the parameters of the neural network of the task-specific identification units 1002a to 1002c are $\theta_a$ to $\theta_c$ and the calculations are $g_a$ to $g_c$, estimated vectors $y_a$ to $y_e$ of the task-specific identification units 1002a to 1002c when the feature value is z are derived by the following (Equation 2) to (Equation 4).

[Expression 2]

$$y_a = g_a(z;\theta_a) \quad \text{(Equation 2)}$$

[Expression 3]

$$y_b = g_b(z;\theta_b) \quad \text{(Equation 3)}$$

[Expression 4]

$$y_c = g_c(z;\theta_c) \quad \text{(Equation 4)}$$

The estimated vector y is a class vector present within an attribute. For example, there are two classes such as a male and a female for the gender. $y_c$ is a two-dimensional vector, and is derived by the following (Equation 5).

[Expression 5]

$$y_c = (y_{c,1}, y_{c,2}) \quad \text{(Equation 5)}$$

A task (age) loss $l_a$ representing a distance between an estimated vector $y_{a,i}$ and a correct answer vector $t_{a,i}$ of attribute estimation for an image $x_i$ is defined as a cross entropy error by the following (Equation 6).

[Expression 6]

$$l_a = -\sum_{i=1}^{C_a} t_{a,i} \log(y_{a,i}) \quad \text{(Equation 6)}$$

Here, $C_a$ is the number of classes of the age task, and $t_{a,i}$ and $y_{a,i}$ are vector elements of the following (Equation 7) and (Equation 8).

[Expression 7]

$$y_a = (y_{a,1}, \ldots, y_{a,C_a}) \quad \text{(Equation 7)}$$

[Expression 8]

$$t_a = (t_{a,1}, \ldots, t_{a,C_a}) \quad \text{(Equation 8)}$$

The correct answer vector $t_{a,i}$ is a one-hot expression vector in which only the element of the correct answer class is 1 and the other elements are 0.

As a prediction vector becomes closer to the correct answer vector, $l_a$ tends to be smaller. A case where $l_a$ is small means that a good prediction is obtained. A task (hair color) loss $l_b$ and a task (gender) loss $l_c$ are similarly defined. Since the correct answer vector t is not present, a disconnection task loss is not calculated.

A total loss is defined as the sum of weights of connected task losses. This weight indicates the degree of update. For example, when only the age and the gender are connected, l is expressed by the following (Equation 9).

[Expression 9]

$$l = \lambda_a l_a + \lambda_c l_c \quad \text{(Equation 9)}$$

Here, $l_a$ and $l_c$ are degrees of update corresponding to the tasks. In learning, related parameters are updated so as to decrease a value of l. For example, when only the age and the gender are connected, parameters $\theta$, $\theta_a$, and $\theta_c$ of the object feature extraction unit 1002 and the connected task-specific identification units 1002a and 1002c are updated.

Figure 6:
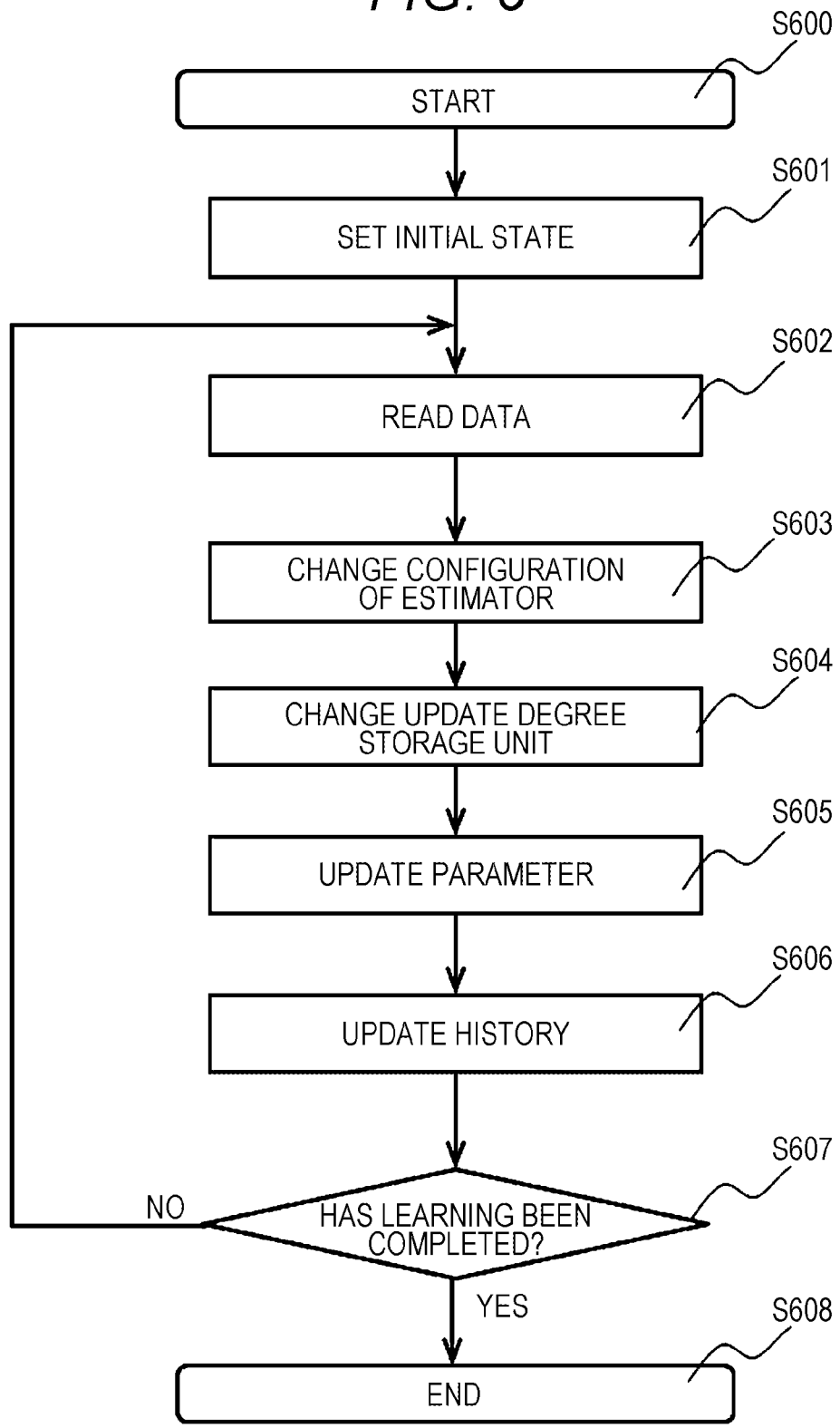
FIG. 6 is a flowchart illustrating details of a learning flow according to the embodiment.

Next, a learning flow will be described with reference to FIG. 6.

When learning is started (S600), constants necessary for learning are set. A batch size which is the number of data to be used for updating the parameters at one time. An upper limit loop number which is an upper limit number of times the parameter is updated.

Order of the classes of each task is defined. For example, there are two classes such as a male and a female for the tasks of the gender. The male is the first, and the female is the second.

Next, the learning control unit 11 creates the task combination ID while referring to the label unit 102.

The task combination ID is assigned to the combination of tasks having the label in order from 1. For example, when the combinations present in the label unit are three types (age, gender), (hair color, gender), and (gender), the task combination IDs are assigned to 1, 2, and 3 in order. The corresponding task combination ID is filled in all data within the label unit.

Even though an original data set before mixing is the same, when the label is missing due to damage, another ID is assigned as illustrated in FIG. 2. Thereafter, the records of the label unit are arranged such that the same combination IDs are continuously arranged. (S601)

Data to be used for one learning step is extracted. First, the task combination ID to be used in the current learning step is randomly decided. The learning control unit 11 acquires labels having the task combination ID from a table of the label unit 102 so as to correspond to the batch size.

In the case of the next same task combination ID, the labels are acquired from a continuation thereof. When the record of the task combination ID reaches the last record in the middle of acquiring the labels, only the record having the task combination ID within the label unit is shuffled. The acquisition is continued from the head of the record having the task combination ID.

Thereafter, each label is set to a one-hot expression vector. For example, when the male is the first and the female is the second for the labels of the gender of the two classes such as the male and the female, a one-hot expression vector $t_c$ of the male is expressed by the following (Equation 10).

[Expression 10]

$$t_c = (1,0) \quad \text{(Equation 10)}$$

The one-hot expression vector $t_c$ of the female is expressed by the following (Equation 11).

[Expression 11]

$$t_c = (0,1) \quad \text{(Equation 11)}$$

Thereafter, the image having the image name described in the label is acquired from the image unit 101 (S602).

The learning control unit 11 updates the connection switch 1001. The connection symbol is input for a target task of the label to be used in the present step, and the disconnection symbol is input for a non-target task (S603).

The learning control unit 11 calculates a new degree of update while referring to the learning history storage unit 140, and substitutes the new degree of update into the update degree storage unit 1003 (S604).

An example of the method of calculating the new degree of update is as follows. The degree of update of the connected task is a reciprocal of the total number of times the task is connected in the past learning, and the degree of update of the disconnected task is 0. FIG. 5 illustrates an example when the degree of update is the third time ($\lambda_a=1/2=0.5$, $\lambda_b=0$, $\lambda_c=1/3=0.3$).

The learning control unit 11 performs calculation by inputting the image to the object feature extraction unit 1000, and calculates the task loss and the total loss for the output result and the label obtained by inputting the obtained output to the task-specific identification unit 1002 of the corresponding task.

The parameters retained by the object feature extraction unit 1000 and the connected task-specific identification unit 1002 by applying an error backpropagation method to the total loss (S605).

The learning control unit 11 receives the task loss of the connected task, and adds, as a new record, the task type and the task loss to the learning history storage unit 103 (S606).

When a learning end condition is satisfied, the learning is ended. When the learning end condition is not satisfied, an operation of S402 is performed (S607). One example of the learning end condition is whether or not the number of times reaches the upper limit loop number. Here, the entire processing from S602 to S606 is called the learning step.

Next, an object recognition method according to the embodiment will be described with reference to FIGS. 7 and 8.

Figure 7:
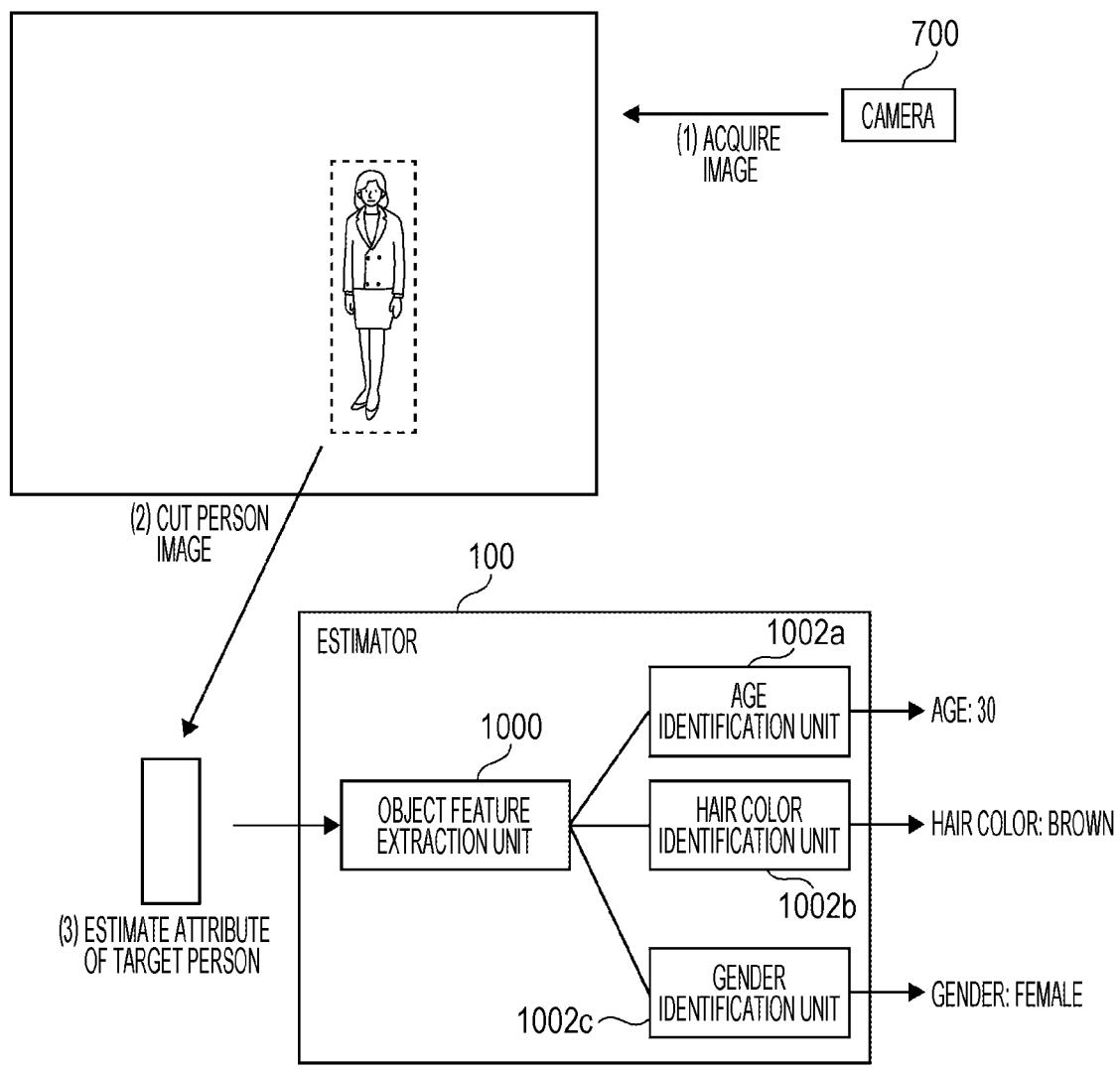
FIG. 7 is a diagram illustrating a practical example of an estimator.
Figure 8:
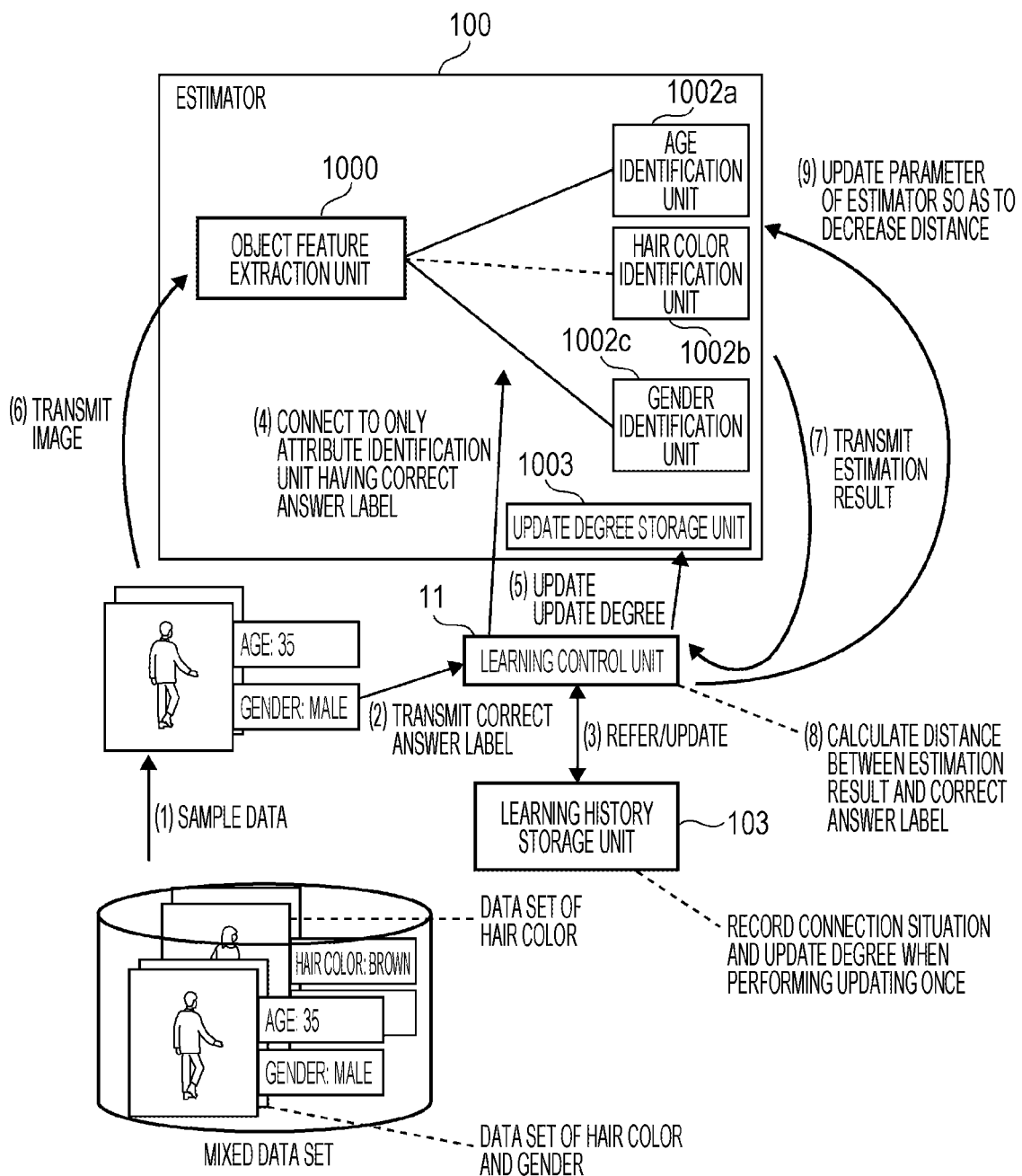
FIG. 8 is a diagram illustrating an outline of learning according to the embodiment.

In the embodiment, an image of a person region by any method is cut out from an image transmitted from a surveillance camera 700 as illustrated in FIG. 7. The estimator 100 estimates a plurality of attributes such as an age, a gender, and a hair color of a person appearing in the cut-out image, and outputs the estimation result. In the embodiment, for example, three attributes of the age, the gender, and the hair color are used as targets.

The estimator 100 is constituted by a neural network. The neural network has parameters, and an output value varies depending on the values of the parameters. These parameters are tuned by a method called learning by using a learning data set prepared in advance. Accordingly, the estimator 100 that can perform appropriate estimation is realized.

The learning data set includes a set of a person image and a label (correct answer label) of an attribute for the person. For example, a label indicating a male is given as the label to an image of the male.

The label is attached in advance by hand. As the number of images becomes larger, the cost of labeling becomes higher. Therefore, it is desirable that a data set labeled for another purpose be used rather than preparing a data set from scratch whenever the labeling is performed.

However, the data set labeled for another purpose may not have the necessary labels. For example, a data set constructed for the purpose of estimating only the age and the gender has only the age and the gender, and does not have the label of the hair color.

The related art is not applicable when there is a missing label as described above. In the present embodiment, the learning of the estimator 100 can also be performed in such a case.

An outline of a learning procedure of the estimator 100 will be described with reference to FIG. 8.

A plurality of data (pairs of the image and the label) having the same type of label is extracted from a mixed data set constructed by mixing a plurality of data sets. This number is called the batch size, and is a preset constant.

The label is transmitted to the learning control unit 11, and the learning control unit 11 changes the connection between the object feature extraction unit 100 and the task-specific identification units 1002a to 1002c within the estimator 100 according to the type of the present label. For example, when the extracted data has only the labels of the age and the gender, the task-specific identification unit 1002a of the age and the task-specific identification unit 1002c of the gender are connected, and the task-specific identification unit 1002b of the hair color is not connected.

The learning control unit 11 changes the degree of update for controlling the intensity of the update of the parameter of the task-specific identification unit 1002. The extracted image is transmitted to the estimator 100, and the estimation results of the task-specific identification unit 1002a of the age and the task-specific identification unit 1002c of the gender are output.

The learning control unit 11 compares the correct answer label with the estimation result, and calculates the distance (loss). The distance is transmitted to the estimator 100, and the estimator 100 updates the parameter such that the distance becomes smaller.

The aforementioned procedure is the overall procedure for one parameter update (called the learning step) in the learning procedure.

According to the aforementioned embodiment, it is possible to suppress the amount of labeling in a construction work of a prerequisite data set in the object recognition system.

Although it has been described in the aforementioned embodiment that the person is used as the target, the present invention is not limited to the person, and can be applied to an object other than the person. For example, the present invention can be applied to the estimation of a color, a type, and a size of a vehicle for the vehicle, and an estimator having such a function can be applied to the search of the vehicle. The same system configuration and learning flow (learning method) as those of the aforementioned embodiment can be used with no change.

What is claimed is:

1. An object recognition system that includes:
   a learning control processor;
   an image database that stores an image of an object;
   a label database that stores a label which is information related on a task which is an attribute of the object; and
   an estimator neural network that estimates the task of the object, and outputs an estimation result, the estimator neural network includes an object feature extraction neural network that extracts an object feature value from the image,
   a plurality of task-specific identification neural networks that identifies the information of the task, and
   a connection switch that stores connection information between the object feature extraction neural network and the plurality of task-specific identification neural networks; and
   the learning control processor changes a connection relationship between the object feature extraction neural network and the plurality of task-specific identification neural networks based on the connection information stored in the connection switch according to a type of the task,
   wherein the connection information is signified by a respective corresponding connection symbol stored in the switch,
   wherein the task-specific neural network has a parameter updatable by learning, and the task-specific identification neural network decodes the information related to the task for the object feature value,
   wherein the learning control processor compares a correct answer label with the estimation result, obtains a task loss which is an error between the estimation result and the correct answer label, and transmits the obtained task loss to the estimator neural network, updates the parameter of the task-specific identification neural network so as to decrease the task loss, wherein the system further includes a learning history memory that stores a learning result up to a latest point of time the learning history memory stores the task loss as the learning result.

2. The object recognition system according to claim 1, wherein the label database stores a learning data set which is a combination of the image and a correct answer label which is a correct answer value of the task of the object.

3. The object recognition system according to claim 1, wherein the learning control processor tunes the parameter by the learning by using the learning data set, and changes an output value of the estimation result by the parameter.

4. The object recognition system according to claim 1, wherein the learning control processor changes a degree of update for controlling intensity of update of the parameter of the task-specific identification neural network.

5. The object recognition system according to claim 4, wherein the estimator neural network further includes an update degree memory that stores the degree of update.

6. An object recognition method using an object recognition system that includes a learning control processor, the method comprising:

storing, by an image database, an image of an object and a label which is information related to a task which is an attribute of the object;

extracting, by an object feature extraction neural network an object feature value from the image of the object;

identifying, by a plurality of task-specific identification neural networks, the information of the task; and changing, by the learning control processor, a connection relationship between the object feature extraction neural network and the plurality of task-specific identification neural networks according to a type of the task, estimating, by an estimator neural network, the task of the object, and outputting an estimation result, wherein at least one of the plurality of task-specific identification neural networks has a parameter updatable by learning, and the at least one task-specific identification neural network decodes the information related to the task for the object feature value, wherein the learning control processor compares a correct answer label with the estimation result, obtains a task loss which is an error between the estimation result and the correct answer label, and transmits the obtained task loss to the estimator neural network, updates the parameter of the task-specific identification neural network so as to decrease the task loss, wherein the system further includes a learning history memory that stores a learning result up to a latest point of time the learning history memory stores the task loss as the learning result.

7. The object recognition method according to claim 6, further comprising:

retaining, by the task-specific identification neural network, a parameter updatable by learning; and tuning, by the learning control processor, the parameter by learning by using a learning data set which is a combination of the image and a correct answer label which is a correct answer value of the task of the object, and changing an output value of the estimation result by the parameter.

* * * * *